United States Patent [19]

Honjo et al.

[11] Patent Number: 4,825,248

[45] Date of Patent: Apr. 25, 1989

[54] SHEET HANDLING APPARATUS

[75] Inventors: Takeshi Honjo, Kawasaki; Naomi Takahata, Yokohama, both of Japan

[73] Assignee: Canon Kabushiki Kaisha, Tokyo, Japan

[21] Appl. No.: 188,676

[22] Filed: Apr. 29, 1988

Related U.S. Application Data

[63] Continuation of Ser. No. 924,736, Oct. 30, 1986, abandoned.

[30] Foreign Application Priority Data

Nov. 6, 1985 [JP] Japan ................................ 60-249621
Nov. 6, 1985 [JP] Japan ................................ 60-249622

[51] Int. Cl.[4] ...................... G03G 15/00; G03B 27/62; B65H 7/02

[52] U.S. Cl. ................................ 355/14 SH; 355/75; 271/111; 271/259; 271/265

[58] Field of Search ............. 355/14 SH, 75; 271/111, 271/259, 265

[56] References Cited

U.S. PATENT DOCUMENTS 3,510,125 5/1970 Krueger et al. ........................ 271/10
4,445,682 5/1984 Uchida ........................... 355/14 SH
4,696,463 9/1987 Nakazato ............................ 271/176

FOREIGN PATENT DOCUMENTS 5989730 8/1978 Japan .
53-89730 8/1978 Japan .
59-13734 3/1984 Japan .
60-5943 2/1985 Japan .

*Primary Examiner*—Patrick R. Salce
*Assistant Examiner*—Judson H. Jones
*Attorney, Agent, or Firm*—Fitzpatrick, Cella, Harper & Scinto

[57] ABSTRACT

A document feeder for a copying machine supplies a sheet to an exposure position by transporting the sheet through the exposure position and then returning the sheet to the exposure position. Detectors on either side of the exposure position measure the time required for the sheet transport, thus identifying the sheet size exactly.

11 Claims, 6 Drawing Sheets

SHEET HANDLING APPARATUS

This application is a continuation of application Ser. No. 924,736, filed Oct. 30, 1986, now abandoned.

BACKGROUND OF THE INVENTION

1. Field of the Invention

The present invention relates to a sheet handling apparatus for feeding a sheet to a predetermined position.

2. Related Background art

In an image forming apparatus such as a copying machine, a sheet handling apparatus or a document feeder is often employed as an attachment for feeding original documents to a predetermined position such as an exposure position.

Such document feeder, often made available as an optional attachment for a copying machine, is therefore subjected to various limitations for example in size, weight and cost, and is required to satisfy various requirements such as a short document exchange time, an automatic document size detection and satisfactory document transportation.

In such conventional document feeder, the automatic document size detection has been achieved by measuring the time from the detection of the front end of a document to the detection of the rear end thereof by a sensor provided at an entrance position for the document. However, such detecting method has not allowed precise size detection due for example to a slipping of rollers.

Also in case such document feeder is employed for copying, satisfactory feeding and discharge of documents cannot be achieved, if another document is left on the platen by mistake, due to the collision of such left document and a newly fed document.

SUMMARY OF THE INVENTION

In consideration of the foregoing, an object of the present invention is to provide an improved sheet handling apparatus.

Another object of the present invention is to provide a sheet handling apparatus capable of satisfactory sheet feeding and discharge.

Still another object of the present invention is to provide a sheet handling apparatus capable of precise sheet size detection.

The foregoing and still other objects of the present invention, and the advantages thereof, will become fully apparent from the following description which is to be taken in conjunction with the attached drawings.

DETAILED DESCRIPTION OF THE PREFERRED EMBODIMENTS

Now the present invention will be clarified in detail by embodiments thereof shown in the attached drawings.

Figure 1:
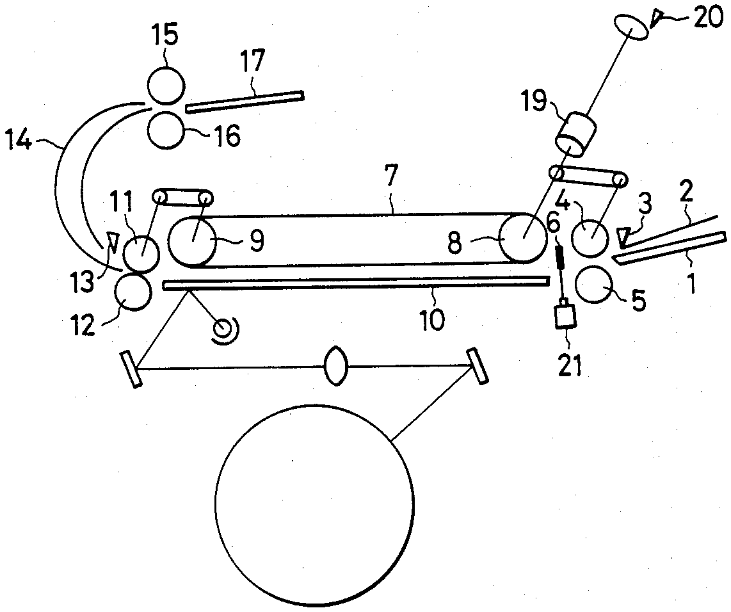
FIG. 1 is a schematic view of a sheet handling apparatus in which the present invention is applicable.

FIG. 1 is a schematic view of a sheet handling apparatus or a document feeder in which the present invention is applicable, wherein an entrance tray 1 supports stacked sheet documents 2, with the image bearing sides thereof facing downwardly. A first sheet sensor (entrance sensor) 3 is a reflective type, for detecting the front and rear ends of sheet documents. Feed rollers 4, 5 are maintained in mutually contacting state to transport the sheet documents therebetween. A stopper 6 for preventing the supply of a sheet document onto a platen glass, is released by a solenoid 21 to enable the feeding of the sheet document. An endless whole-surface belt 7 has a width sufficient for covering the entire area of the sheet document, has a surface of a sufficiently high friction coefficient for transporting the sheet document by the frictional force over the platen glass 10, and is mounted on a driving roller 8 and an idler roller 9 in such a manner that no slippage occurs between the belt 7 and the driving roller 8. Discharge rollers 11, 12 are maintained in a mutually contacting state to transport the sheet document discharged from the platen glass 10. A reflective exit sensor 13 stops the belt 7 and the rollers 11, 12 upon detecting the front end of the sheet document, and then detects the rear end of the document in the reverse movement thereto, thus stopping said document at a predetermined position. After the sheet document is exposed, it is transported by the discharge rollers 11, 12 along guide members 14 and stacked on a discharged sheet tray 17, through mutually contacting discharge rollers 15, 16. The feed roller 4, belt 7 and discharge rollers 11, 15 are driven by a motor 19.

Figure 2:
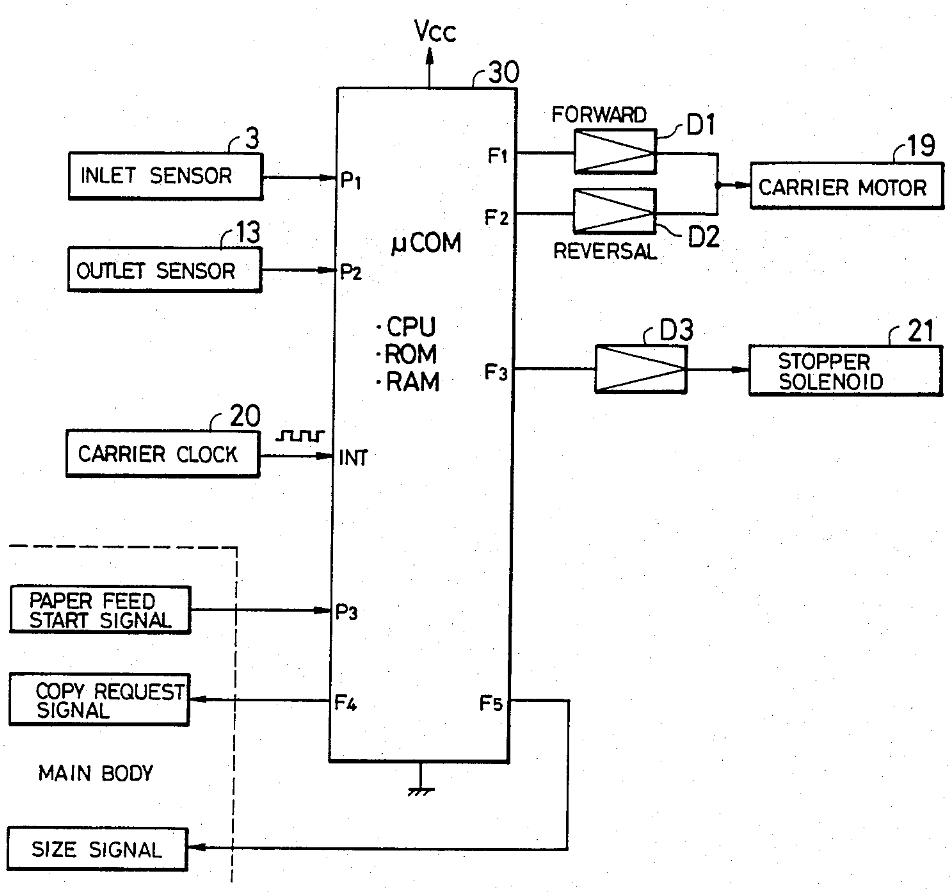
FIG. 2 is a block diagram of a control unit of said sheet handling apparatus.

FIG. 2 is a block diagram of a control unit of the document feeder, wherein a microcomputer 30 of a known structure incorporating a CPU, a ROM, a RAM etc. An interruption port INT receives pulse signals from a clock generator 20 when the motor 19 is activated, and the function of the document feeder is controlled according to said pulse signals. An input port Pl receives a signal from the first sheet sensor (entrance sensor) 3, while an input port P2 receives a signal from the exit sheet sensor 13. Output ports F1–F3 supply drivers D1–D3 with forward and reverse drive signals for the motor 19, and a drive signal for a stopper solenoid 21, in response to the input signals to the microcomputer 30.

Another input port P3 receives a start signal for the document feeder from the copying machine, while another output port F4 releases a copy start signal for said copying machine, and an output port F5 supplies said copying machine with data indicating the detected sheet size, in response to which the copying machine selects and indicates a cassette.

Figure 3A:
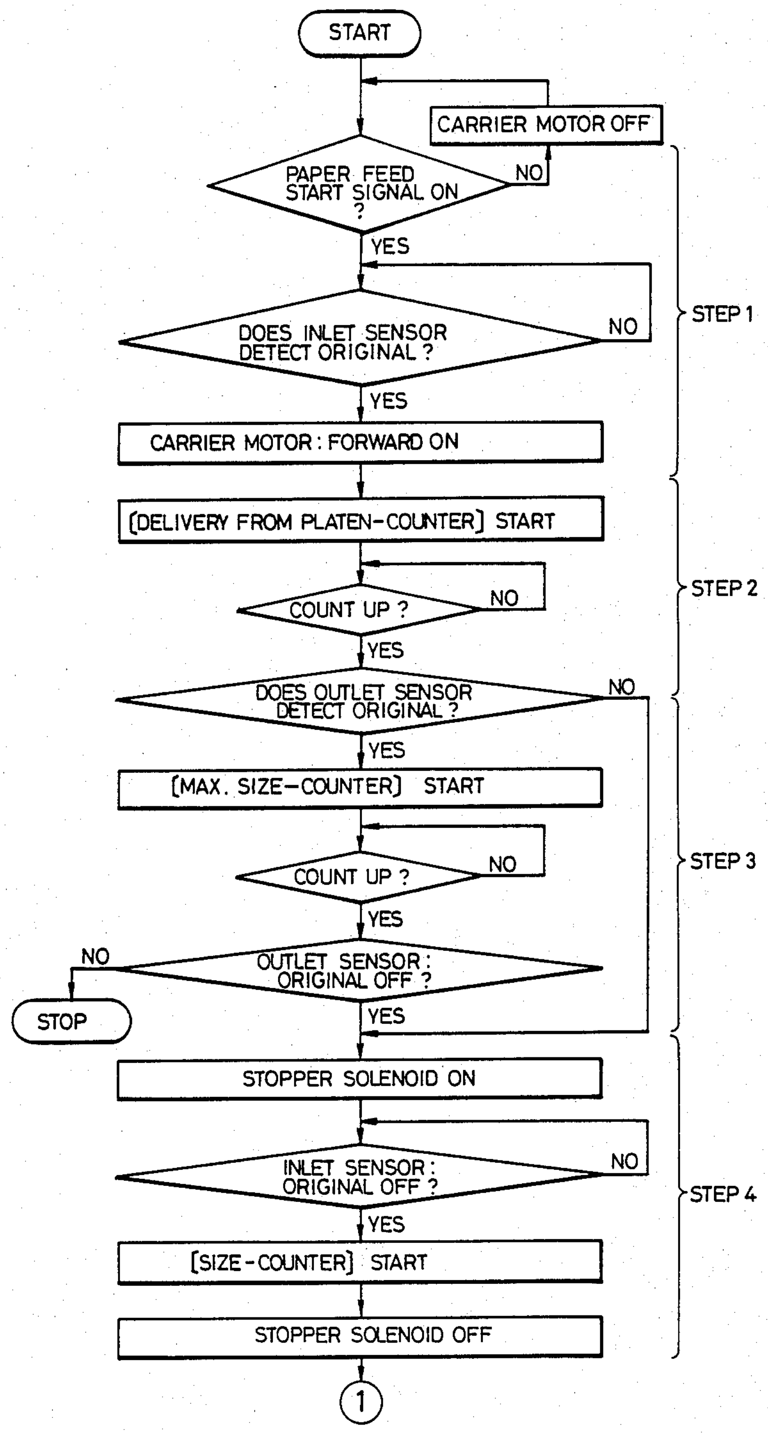
FIGS. 3A, 3B and 3C are flow charts showing the function of the sheet handling apparatus.
Figure 3B:
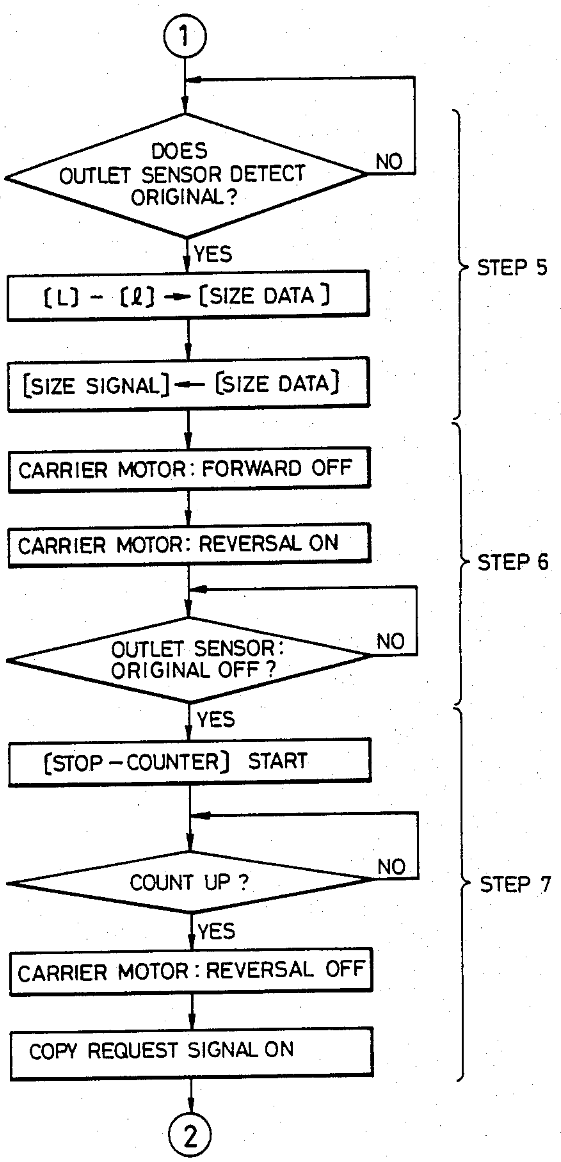
Figure 3C:
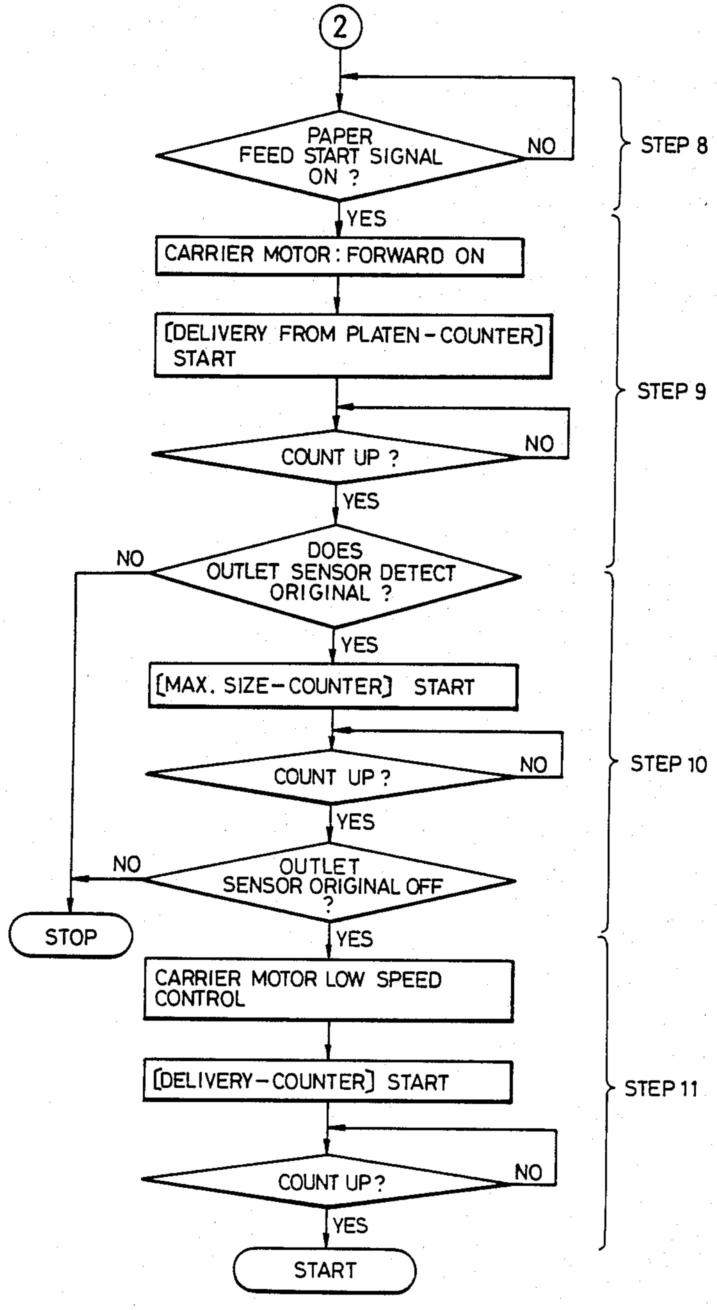

Now reference is made to the flow charts shown in FIGS. 3A, 3B and 3C.

When the sheet documents are placed on the entrance tray 1 during the supply of a sheet feed start signal from the copying machine, the motor 19 is turned in response to the detection of said sheets by the entrance sensor 3 (step 1). Then a discharge counter corresponding to the distance from a predetermined position on the platen glass 10 to the exit sensor 13 is activated, and there is discriminated whether the exit sensor 13 has detected a sheet document upon expiration of said counter (step 2). An eventual sheet detection in this state indicates that a sheet document forgotten by a previous operator has been properly discharged, and said sheet document is thereafter inspected until it is normally discharged onto the tray 17. This is achieved by checking the state of the exit sensor 13 at the expiration of a maximum size counter, and, if a sheet is still detected at this timing, an abnormality is identified and the function of the apparatus is terminated (step 3). When said sheet is discharged normally or if the exit sensor 13 does not detect a sheet in the aforementioned step 2, it is identified that all the sheet documents left in the platen have been discharged and the feeding of the sheet documents stacked on the entrance tray 1 is started. In the control sequence, the sheet feeding is started by energizing the stopper solenoid 21. When the entrance sensor 3 detects the rear end of a sheet, a size counter is started and the stopper solenoid 21 is deactivated to prohibit the feeding of a succeeding sheet document (step 4).

In this manner, at the start of sheet feeding of the document feeder, the exit sensor at the exit side of the platen glass is inspected for a predetermined period required by the front end of a sheet eventually present on said platen glass to reach said exit sensor, and a sheet set at the entrance of the document feeder is forbidden to enter the platen glass during said period. If the exit sensor is not activated during said period, the feeding of the original at the entrance side is enabled. On the other hand, if the exit sensor is turned on, the feeding of the sheet at the entrance side is enabled only after the forgotten sheet has been discharged. In this manner it is rendered possible to avoid the collision of a forgotten sheet and a newly fed sheet and to achieve satisfactory sheet feeding.

Figure 4:
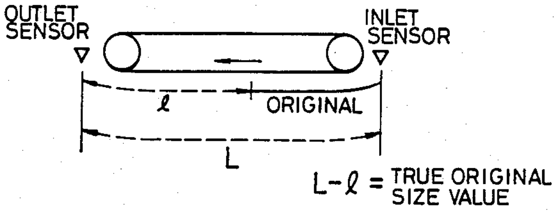
FIG. 4 is a schematic view showing the principle of document size detection.

The sheet document transported onto the platen glass passes through the predetermined position and reaches the exit sensor 13 positioned at the downstream side. When said exit sensor 13 detects the front end of said sheet document, the sheet size is identified from the data of the aforementioned size counter for counting the feed distance. As shown in FIG. 4, the actual sheet size value is obtained from a fixed value L indicating the distance from the entrance sensor 3 to the exit sensor 13 minus the count ( of the size counter. The sheet size B5, A4, B4 or A3 is identified from said size value, and a size signal is supplied to the copying machine (step 5).

In this manner the entrance sensor positioned at the upstream side of the platen glass detects the rear end of the sheet document while the exit sensor positioned at the downstream side detects the front end of said sheet document, and sheet size data is calculated from the time required for transportation. Thus the size measurement is conducted while the sheet is maintained by the whole-surface belt on the platen glass and can therefore be made with high accuracy without error caused by slippage.

The motor 19 is then stopped and reversed to move the sheet document toward the platen glass (step 6). When the sheet detection by the exit sensor 13 is terminated, a stop counter for defining the distance from the exit sensor 13 to the predetermined position on the platen glass is activated, and, upon expiration of said counter, the motor 19 is stopped and a copy request signal is supplied to the copying machine, which in response initiates an exposure operation according to the aforementioned size signal (step 7).

Figure 5:
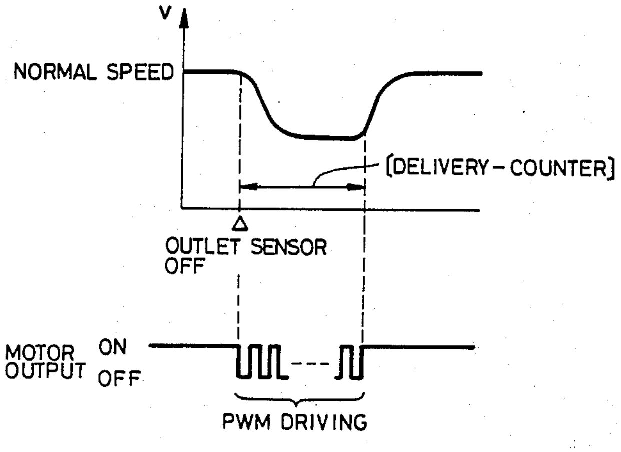
FIG. 5 is a chart showing the principle of pulse width modulation motor drive.

After a preset number of exposure operations, there is initiated the discharge of the sheet document. The copying machine again releases the sheet feed start signal (step 8), in response to which the motor 19 starts forward rotation. Also the aforementioned discharge counter is activated, and, upon expiration thereof, the state of the exit sensor 13 is checked (step 9). This operation is different from those in the foregoing steps 2, 3 in that the function of the apparatus is terminated if no sheet is detected. Absence of detection in this state means an abnormality since it is already known that a sheet document has existed on the platen glass 10. On the other hand, if the exit sensor detects a sheet, the sequence waits until the exit sensor 13 detects the rear end of the sheet in the same manner as in the aforementioned step 3 (step 10). When a trailing edge of the sheet document passes the exit sensor 13, the driving speed of motor 19 is shifted to a low speed by a known pulse width modulation drive as shown in FIG. 5. In this manner the rear end of the sheet document is not kicked much by the discharge rollers 15, 16 and the sheet can therefore be stacked neatly. The time required for sheet exchange is maintained at a minimum without sacrificing the performance of the document feeder, since the sheet transportation is normally conducted at a high speed except for a limited period in the sheet discharge. A step 11 executes the low speed drive for a period defined by the discharge counter, and the sequence then returns to the start point.

Though the present invention has been explained by an embodiment for transporting original sheet documents, the present invention is not limited to such embodiment and is applicable for example to other sheets such as recording sheets.

We claim:

1. An original document handling apparatus comprising:

- feed means for feeding an original document to an exposure position, said feed means being adapted, in the feeding to said exposure position, to transport the original document beyond said exposure position and then returning the original document to said exposure position;
- first detection means for detecting the original document at the upstream side of said exposure position;
- second detection means for detecting the original document at the downstream side of said exposure position; and
- identification means for identifying the size of the original document based on the time from the detection of the original document by said first detection means to the detection of the original document by said second detection means.

2. An original document handling apparatus according to claim 1, wherein said first detection means is adapted to detect the rear end of the original document.

3. An original document handling apparatus according to claim 1, wherein said second detection means is adapted to detect the front end of the original document.

4. An original document handling apparatus according to claim 1, wherein said identification means is adapted to identify the size of the original document based on the time from the detection of the original document by said first detection means to the detection of the original document by said second detection means, and on the distance from said first detection means to said second detection means.

5. An original document handling apparatus comprising:

stacker means for supporting original documents;

transport means for transporting the original documents stacked on said stacker means one by one to an exposure position and discharging said original documents after exposure thereof, said transport means being adapted, in feeding to said exposure position, to transport the original document beyond said exposure position and then to return the original document to said exposure position;

detection means for detecting the original document at the downstream side of said exposure position; and control means for controlling said transport means in such manner, in transporting the original document stacked on said stacker means to said exposure position, as to start the transport of the original document to said exposure position if an original document is not detected for a predetermined period at the downstream side of said exposure position.

6. An original document handling apparatus according to claim 5, wherein said predetermined period corresponds to a time for handling a maximum size of the original document.

7. An original document handling apparatus according to claim 5, wherein the transport of the original documents stacked on said stacker means is initiated, in case said detection means detects an original documents within said predetermined period, after said original document has been discharged.

8. A sheet handling apparatus comprising:

feed means for feeding a sheet to a predetermined position;

first detection means for detecting the rear end of a sheet fed by said feed means;

second detection means positioned at the downstream side of said first detection means and adapted to detect the front end of a sheet fed by said feed means; and identification means for identifying the size of the sheet according to the outputs of said first and second detection means, wherein said identification means is adapted to measure the period from the detection of the rear end of the sheet by said first detection means to the detection of the front end of the sheet by said second detection means and to identify the sheet size from the thus measured period.

9. A sheet handling apparatus according to claim 8, wherein said sheet is an original document, and said predetermined position is an exposure position.

10. A sheet handling apparatus according to claim 9, wherein said feed means is adapted, in feeding to said exposure position, to feed the original document beyond said exposure position and then to return said original document to said exposure position.

11. A sheet handling apparatus according to claim 10, wherein said second detection means is positioned at the downstream side of said exposure position.

* * * * *

UNITED STATES PATENT AND TRADEMARK OFFICE
CERTIFICATE OF CORRECTION

PATENT NO. : 4,825,248

DATED : April 25, 1989

INVENTOR(S) : TAKESHI HONJO, ET AL.

It is certified that error appears in the above-identified patent and that said Letters Patent is hereby corrected as shown below:

COLUMN 3

Line 46, "count ( of" should read --count 1 of--.

Signed and Sealed this

Sixteenth Day of July, 1991

Attest:

HARRY F. MANBECK, JR.

Attesting Officer

Commissioner of Patents and Trademarks